United States Patent [19]
Adachi

[11] 3,847,814
[45] Nov. 12, 1974

[54] GREASE INTERCEPTOR

[75] Inventor: Rai Reiji Adachi, Scarborough, Ontario, Canada

[73] Assignee: Sarco Canada Limited, Agincourt, Ontario, Calif.

[22] Filed: Feb. 26, 1973

[21] Appl. No.: 335,819

[30] Foreign Application Priority Data
Mar. 2, 1972 Canada .............................. 136,022

[52] U.S. Cl. ............................... 210/237, 210/532
[51] Int. Cl. ............................................. B01d 21/02
[58] Field of Search .......... 210/232, 237, 246, 305, 210/310, 532, 532 S

[56] References Cited
UNITED STATES PATENTS
3,040,895  6/1962  Sisk .................................... 210/164

| | | | |
|---|---|---|---|
| 2,059,844 | 11/1936 | Boosey | 210/237 X |
| 549,967 | 11/1895 | Jacoby | 210/232 |
| 2,003,140 | 5/1935 | Dehn | 210/532 X |
| 2,611,488 | 9/1952 | Resan | 210/532 X |

FOREIGN PATENTS OR APPLICATIONS
540,361  4/1957  Canada ........................... 210/532 S Primary Examiner—Theodore A. Granger

[57] ABSTRACT

An interceptor for separating grease and oil from water and for treating said grease and oil, where desirable, with chemicals, said interceptor comprising a tank having a novel liquid-tight and gas-tight lid construction and a novel baffle system and discharge compartment incorporated within the tank.

5 Claims, 3 Drawing Figures

GREASE INTERCEPTOR

BACKGROUND OF THE INVENTION

This invention relates to grease interceptors and, more particularly, relates to an improved grease interceptor for receiving grease and oil-laden water effluents from commercial kitchens, garages and the like and for separating and recovering the grease and oil from the water or, where desirable, for breaking down the grease using an enzyme such that the grease will be harmlessly disposed of with the water.

Grease interceptors consisting of tanks having a plurality of internal baffles for effecting quiescent settling conditions for the separation of liquid constituents from emulsions according to specific gravities are known. These separators, however, normally are bulky in size with external protuberances that render installation difficult. Conventional grease interceptors are positioned in drain lines at an elevation relative to the gradient such that little, if any, internal hydrostatic pressure is exerted on the tank lid. Accordingly, the tank lid often is satisfactorily secured to the tank by a single central bolt having a handle hidden in a lid recess. However, the creation of low hydrostatic pressures of 2 – 3 pounds per square inch due to the surging of effluent from a large sink, for example, can cause slight leakage of grease or gas about the periphery of the lid. More extreme deformation of the cover due to higher pressures can result in the fracture of the bolt or cracking of the lid with the escape of considerable amounts of effluent.

The grease interceptor of the present invention, for treating grease-containing water, which interceptor substantially overcomes the foregoing problems, comprises a tank having an inlet end and an outlet end, a plurality of baffles disposed within the tank in proximity to the inlet end to establish quiescent flow conditions to a liquid entering the tank, an inverted weir incorporated within the tank in proximity to the outlet end defining a compartment to permit discharge of water and retention within the tank of grease, said inverted weir having a double wall defining an air gap communicated to the exterior of the tank, a tank lid adapted to seat on the rim of the tank and means for securing said lid to the rim to make a liquid-tight and gas-tight seal therebetween, and a bolt handle passing through said cover-well adapted to engage an underlying portion of the tank and secure the cover-well to the tank whereby the lid is peripherally and centrally secured to the tank.

SUMMARY OF THE INVENTION

It is a principal object of the present invention therefore to provide a compact grease interceptor having a minimum of protuberances for ease of installation.

It is another object of the present invention to provide a grease interceptor which will effectively separate grease and oil from water or break down the grease by the addition of chemicals while providing a water-tight and gas-tight seal between the interceptor tank and lid capable of withstanding low hydrostatic pressures.

Another object of the present invention is the provision of a grease interceptor having a novel cover arrangement which will not only provide a liquid and gas-tight seal capable of withstanding low pressures but which also readily permits opening of an inspection port for access to the interior of the interceptor and for the selective addition of chemicals.

BRIEF DESCRIPTION OF THE DRAWING

These and other objects of the invention, and the manner in which they can be attained, will become apparent from the following detailed description of the drawings, in which:

FIG. 3 is a section of a portion of grease interceptor showing an alternative form of securement of cover to tank.

DESCRIPTION OF THE PREFERRED EMBODIMENT

Figure 1:
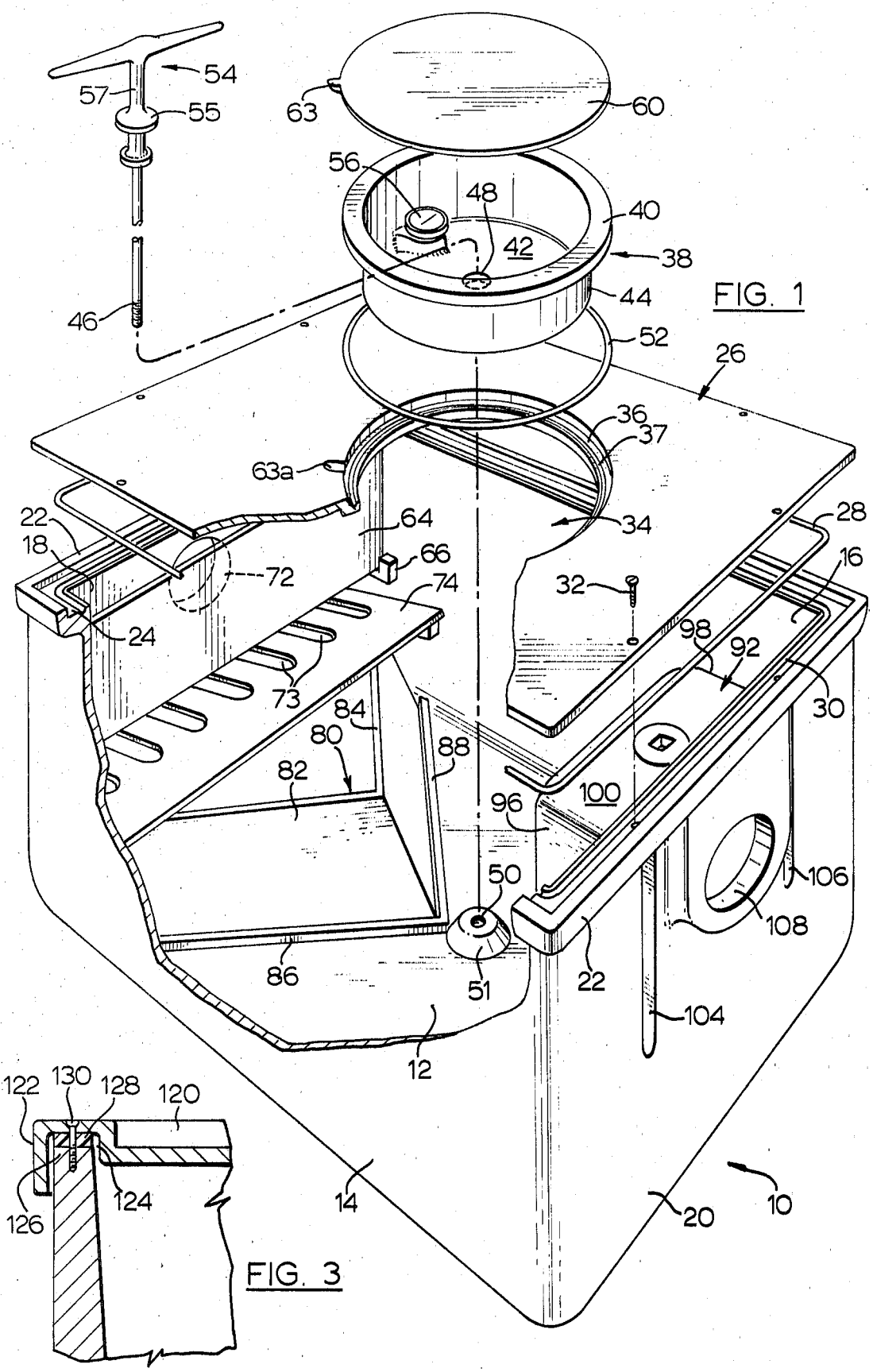
FIG. 1 is an exploded perspective view of the interceptor of the present invention.

Like reference numerals refer to like parts throughout the description of the drawing.

With reference to FIG. 1, the grease interceptor of the invention comprises generally rectangular tank 10 having base 12, side walls 14, 16 and end walls 18, 20. Flange 22 is formed on the rim of the tank defining recess 24 for receiving tank lid 26 therein. Gasket 28 is adapted to seat in groove 30 formed in the aforementioned recess 24 such that securement of lid 26 to the tank by means of a plurality of screw-bolts 32, as shown most clearly in FIG. 2, provides an effective liquid seal between the periphery of the lid and the tank rim.

Circular opening 34 formed generally centrally in lid 26 has surrounding annular recess 36 formed in the lid to receive circular cover-well or mixing chamber 38 which consists of flanged rim 40, lowered central portion 42, and connecting side wall 44. Cover-well 38 is tightly secured to tank 10 by means of a T-handle 54 which is inserted through central opening 48 to engage threaded bolt 46 which in turn engages threaded opening 50 formed in upset 51 in the base wall 12 of the tank. Handle 54 has annular shoulder 55 formed on its shank 57 with a diameter greater than that of opening 48 such that shoulder 55 will engage the tightly abut gasket 59 against basal wall 42. An annular ridge 61 having a diameter less than that of opening 48 is formed on the end of handle 54 to receive O-ring 49 which has a diameter greater than opening 48 for abutment of the O-ring on the underside of basal wall 42.

The chamber defined by cover-well 38 is sufficiently deep to receive handle 54 and thermometer 56 which is threaded into the base 42 of cover 38 such that thermometer extension 58 projects into the interior of the tank. O-ring 52 disposed between the underside of flange 40 and recess 36 and seated in annular groove 37 ensures an effective liquid and gas seal about the periphery of cover-well 38. Circular access cover 60, preferably coextensive with rim 40 to conceal the cover-well, is seated on said rim to provide a continuously planar external surface on the lid 26. Lug 63 projecting from cover 60 is provided for insertion into notch 63a formed on lid 26 for ease of lifting of cover 60 and for stationary alignment of the cover on the lid for uniformity of cross-hatching patterns on the lid and cover.

Figure 2:
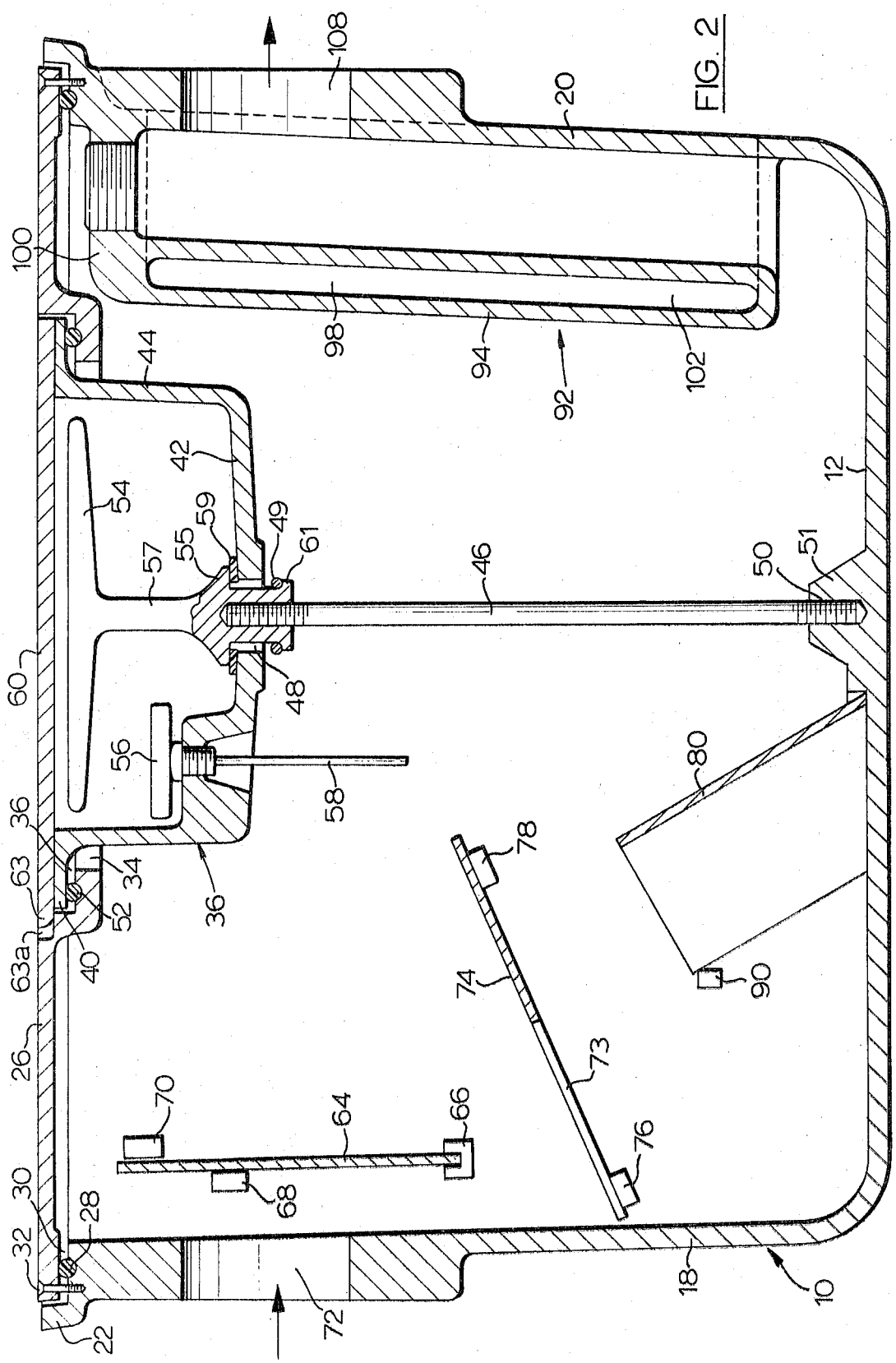
FIG. 2 is a longitudinal sectional view taken along the line 2 — 2 of FIG. 1, showing the interceptor in its assembled form.

Tank 10 contains vertical baffle 64 disposed transversely within the tank in proximity to the tank inlet end opposite opening 72 supported by bottom support 66 formed in the side walls 14, 16 and by side supports 68, 70, also formed in the side walls, shown most clearly in FIG. 2.

Second baffle 74, having a plurality of equispaced openings 73, is disposed transversely of the tank 10 at a slight angle to the horizontal, as shown most clearly in FIG. 2, by spaced supports 76, 78 formed in the tank side walls.

Third baffle 80, having a pair of walls 82, 84 inclined to each other at about 90° and inclined to the base 12 at an acute angle, is positioned on the base 12 abutting elongated detents 86, 88 and side wall supports 90.

The inverted weir designated generally by numeral 92 is incorporated with the tank structure at the tank discharge end, as shown most clearly in FIG. 2, and comprises transverse wall 94, side walls 96, 98 and top wall 100. An air gap 102 is formed within walls 94, 96 and 98 and extends externally of the tank to the atmosphere by communicating recesses 104, 106 formed in the end wall 20, as shown in FIG. 1. Inverted weir 92 thus forms a closure about discharge outlet 108, for reasons which will become apparent as the description proceeds.

In operation, lid 26 and mixing chamber 38 are screwed and bolted onto tank 10 to provide a liquid-tight and gas-tight seal therebetween. Effluents from kitchens such as water containing grease, oil or the like of a lower specific gravity than water are introduced into the tank through inlet 72 and are deflected laterally and downwardly by baffle 64 through openings 73 of baffle 74. The effluent then rises over baffle 80 at a slow rate and travels towards inverted weir 92 to descend under weir lip 112 to rise and discharge through outlet 108.

Liquids such as grease and oils in the water, usually in the form of loose grease-in-water emulsions, progressively rise as the liquids travel from baffle 64 towards the discharge end of the tank and, under the quiescent conditions created and maintained, coalesce to form a floating layer of the grease or oil above the liquid travelling through the separator. The air gap 102 ensures the fracturing of the inverted weir, possibly causing leakage of the liquid treated, will be detected by the escape of liquid from the tank through recesses 104, 106.

For periodic inspection of the interior of the tank, cover 60 is removed permitting release of handle 54 from bolt 46. The cover-well 38 is raised from lid 26 by the lifting of handle 54 due to the frictional engagement of O-ring 49 on the underside of cover-well base 42.

Chemicals such as enzymes can be introduced to the tank by mixing the chemicals with water in the mixing chamber of the cover-well, allowing the mixture to stand as necessary, and then loosening handle 54 to permit the mixture to flow by gravity through opening 48 into the tank.

FIG. 3 shows another embodiment of the invention in which lid 120 has flanged edge 122 defining recess 124 adapted to overlie tank rim 126. A gasket 128 disposed between rim 126 and recess 124 provides an effective liquid and gas seal therebetween when lid 120 is tightened onto rim 126 by screws 130.

The present invention provides a number of important advantages. The tank is rectangular in shape and free from large protuberances, thus simplifying installation. The inverted weir is fully contained within the tank while communicated with the atmosphere by an air gap. The cover-well can be readily removed independent of the lid for inspection of the tank interior or chemicals can be readily mixed in the mixing chamber and introduced to the tank by loosening of the securing handle. The lid and cover-well in combination with the securing means normally provide an effective liquid and gas seal which will withstand internal hydrostatic pressures of up to 15 pounds per square inch.

What we claim as new and desire to protect by letters patent of the United States is:

1. An interceptor for treating grease in water comprising: a tank having an inlet end and an outlet end, a plurality of baffles disposed within the tank to control the flow of water through the tank for effecting a separation of grease from water by gravity, means at the tank outlet end for retaining separated grease within the tank, a lid for closing said tank, means for securing said lid peripherally to the tank to effect a liquid-tight and gas-tight seal therebetween, said lid having a circular opening and an annular recess formed in its upper surface about the circular opening, a cover-well having a circular side wall with closed bottom and a flanged rim formed on the side wall adapted to seat in said lid opening on the annular recess, and means for securing the cover-well tightly to the tank to effect a liquid-tight and gas-tight seal therebetween and to secure the central portion of the lid to the tank comprising a bolt and handle assembly, said bolt being fastenable to an underlying portion of the tank and said handle having a shank portion extensible through an opening in the cover-well adapted to be threaded onto said bolt, an annular shoulder formed on the handle shank having a diameter greater than the diameter of the opening in the cover-well whereby the shoulder tightly abuts the cover-well upon fastening of the bolt and handle assembly to the tank, an annular ridge formed on the shank portion extensible through the cover-well opening, and an O-ring seated on said shank portion against the ridge adapted to abut the underside of the cover-well whereby the cover-well can be raised from the lid by release of the handle from the bolt and raising of the handle.

2. In a grease interceptor as claimed in claim 1, said baffles comprising first baffle mounted transversely in said tank in proximity to the inlet end for deflecting inwardly flowing liquid laterally and downwardly; a second transverse baffle having a plurality of openings formed therein for distributing liquid flow uniformly across the tank, and a third baffle mounted generally transversely in said tank at the bottom thereof for deflecting the liquid upwardly and longitudinally towards the outlet end of the tank.

3. An interceptor as claimed in claim 1, said means at the tank outlet end for retaining separated grease within the tank comprising an inverted weir having a transverse wall and depending side walls appended to the tank end wall and having a top closure wall defining a closed compartment whereby liquid discharging from said tank outlet end must pass under the lip defined by the said inverted weir into the compartment for egress from the tank.

4. An interceptor as claimed in claim 5, said transverse wall and side walls each being hollow and having a continuous air gap formed therein substantially coextensive with said walls, and said end wall having elongated slots formed therein communicating said air gap externally of the tank, whereby leakage in said transverse or side walls will be manifested by leakage externally of the tank.

5. An interceptor for separating matter having a lower specific gravity than water from water comprising a tank having an inlet end and an outlet end, a plurality of baffles disposed within the tank to control the flow of water through the tank for effecting a separation of said matter from water by gravity, and means at the tank outlet end for retaining said separated matter within the tank comprising an inverted weir having a hollow transverse wall and hollow depending side walls appended to the tank end wall and having a top closure wall defining a closed compartment whereby liquid discharging from said tank outlet end must pass under the lip defined by the said inverted weir into the compartment for egress from the tank, said hollow transverse wall and hollow side walls each having a continuous air gap formed therein substantially coextensive with said walls, and said end wall having elongated slots formed therein communicating said air gap externally of the tank, whereby leakage in said transverse or side walls will be manifested by leakage externally of the tank.

* * * * *